(12) United States Patent
Ida et al.

(10) Patent No.: US 8,155,448 B2
(45) Date of Patent: Apr. 10, 2012

(54) IMAGE PROCESSING APPARATUS AND METHOD THEREOF

(75) Inventors: Takashi Ida, Kanagawa (JP); Nobuyuki Matsumoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 600 days.

(21) Appl. No.: 12/398,742

(22) Filed: Mar. 5, 2009

(65) Prior Publication Data
US 2009/0226111 A1   Sep. 10, 2009

(30) Foreign Application Priority Data

Mar. 6, 2008  (JP) ................................ 2008-056338

(51) Int. Cl.
*G06K 9/48* (2006.01)
(52) U.S. Cl. ........................................ 382/199; 382/273
(58) Field of Classification Search .................. 382/199
See application file for complete search history.

(56) References Cited

U.S. PATENT DOCUMENTS

| | | | | |
|---|---|---|---|---|
| 5,454,052 | A * | 9/1995 | Kojima | 382/233 |
| 6,055,335 | A | 4/2000 | Ida et al. | |
| 6,535,650 | B1 * | 3/2003 | Poulo et al. | 382/284 |
| 7,428,335 | B2 | 9/2008 | Ida et al. | |
| 7,440,614 | B2 | 10/2008 | Ida et al. | |
| 7,657,059 | B2 * | 2/2010 | Olson et al. | 382/103 |
| 7,856,137 | B2 * | 12/2010 | Yonezawa et al. | 382/136 |
| 2002/0051572 | A1 | 5/2002 | Matsumoto et al. | |
| 2003/0156301 | A1 * | 8/2003 | Kempf et al. | 358/486 |
| 2006/0188160 | A1 | 8/2006 | Matsumoto et al. | |
| 2006/0221090 | A1 | 10/2006 | Takeshima et al. | |
| 2007/0206860 | A1 | 9/2007 | Ida et al. | |
| 2007/0206875 | A1 | 9/2007 | Ida et al. | |
| 2007/0269137 | A1 | 11/2007 | Ida et al. | |
| 2008/0013784 | A1 | 1/2008 | Takeshima et al. | |
| 2008/0267533 | A1 | 10/2008 | Ida et al. | |
| 2010/0033584 | A1 * | 2/2010 | Watanabe | 348/208.13 |
| 2010/0303340 | A1 * | 12/2010 | Abraham et al. | 382/154 |

OTHER PUBLICATIONS

U.S. Appl. No. 12/398,742, filed Mar 5, 2009, Ida, et al.
U.S. Appl. No. 12/408,918, filed Mar. 23, 2009, Takeshima, et al.
U.S. Appl. No. 12/397,747, filed Mar. 4, 2009, Nobuyuki Matsumoto, et al.
U.S. Appl. No. 12/048,925, filed Mar. 14, 2008, Nobuyuki Matsumoto, et al.
Takashi Ida, et al., "Reconstruction-based Super-resolution Using Self-congruency of Images", The Institute of Electronics, Information and Communication Engineers Technical Report, CS2007-52, IE2007-135(Dec. 2007), pp. 135-140.
Yoshikazu Suematsu, et al., "Image Processing Engineering", Chap. 5, Sec. 4, 2002, 3 pages.

\* cited by examiner

*Primary Examiner* — Sath V Perungavoor
(74) *Attorney, Agent, or Firm* — Oblon, Spivak, McClelland, Maier & Neustadt, L.L.P.

(57) ABSTRACT

An image processing apparatus sets respective pixel values of a template block which includes a pixel to be determined for each pixel to be determined set in sequence in an image, arranges a plurality of reference blocks so as to surround the template block, obtains respective block matching errors between the respective pixel values of the plurality of reference blocks and the respective pixel values of the template block, and determines that the pixel to be determined is in an edge area when a smallest value from among the block matching errors is a deviated value from all the block matching errors.

13 Claims, 9 Drawing Sheets

FIG. 6

| 1 | 2 | 1 |
|---|---|---|
| 0 | 0 | 0 |
| -1 | -2 | -1 |

PIXEL TO BE DETERMIND

FIG. 7

| 1 | 0 | -1 |
|---|---|---|
| 2 | 0 | -2 |
| 1 | 0 | -1 |

FIG. 10

LONG EDGE

ENTERED IMAGE

FIG. 11

SOBEL

DETECTABLE

FIG. 12

SHORT EDGE (TEXTURE)

DETECTED INVOLUNTARILY

PRESENT INVENTION

DETECTABLE
(THERE IS A BLOCK
HAVING SPECIFICALLY
SMALL ERROR)

NOT DETECTED
(THERE IS NO BLOCK
HAVING SPECIFICALLY
SMALL ERROR)

IMAGE PROCESSING APPARATUS AND METHOD THEREOF

CROSS-REFERENCE TO RELATED APPLICATION

This application is based upon and claims the benefit of priority from the prior Japanese Patent Application No. 2008-56338, filed on Mar. 16, 2008; the entire contents of which are incorporated herein by reference.

FIELD OF THE INVENTION

The present invention relates to an image processing apparatus configured to improve the image quality of image data and a method thereof.

DESCRIPTION OF THE BACKGROUND

The image quality of a blurred image may be sharpened by processing a portion where the luminance is changed such as a boundary of a photogenic subject or a character, that is, an edge area of the image. For example, in JP-A 2007-310837 and "Reconstruction-based Super-resolution using self-congruency of images" Technical Report of Institute of Electronics Information and Communication Engineers, Institute of Electronics Information and Communication Engineers, December 2007, Volume 107, No. 379, CS 2007-52, p. 135-140 by Ida, Matsumoto, and Isogawa, whether it is an edge area or not is determined on the pixel to pixel basis on the image using Sobel operator (for example, see "Image processing engineering" by Ryoichi SUEMATSU and Hironao YAMADA, issued from Corona K. K, first edition, October 2000, p. 105) on an entered image as shown in FIG. 16. Then, when it is determined to be an edge area, a sharpening process referred to as Reconstruction-based Super-resolution is applied to a peripheral area thereof.

There are two types of Sobel operators. A first type is to detect an edge in the horizontal direction by inspecting the luminance difference between pixels above and below a pixel to be determined as shown in FIG. 6. A second type is to detect an edge in a vertical direction by inspecting the luminance difference between pixels on the left and right sides as shown in FIG. 7. Then, the Sobel operators carry out sum-of-product calculation on 3×3 pixels around the pixel to be determined with coefficients shown in FIG. 6 and FIG. 7. The Sobel operators determine whether the pixel to be determined is in the edge area or not using the output values therefrom.

In Ida et. al, the pixel to be determined is determined to be an edge area when the sum of absolute values of outputs of the two Sobel operators in the horizontal direction and the vertical directions is larger than a threshold value. For example, an edge detection results by the Sobel operators when an edge area as shown in FIG. 10 is entered are shown in FIG. 11. Round marks in FIG. 10 represent pixels, and the white color and the black color represent their luminance. In this example, the luminance is expressed in two tones for the simplicity. However, there is an intermediate luminance values in fact, and in such a case, the luminance value has 256 tones from 0 to 255. Squares in FIG. 11 represent positions which are determined to be the edge areas. In this manner, detection is achieved correctly along the actual edge area.

As described above, by using the Sobel operators, the edge areas of the image can be detected, and by applying image processing such as sharpening to the edge areas, the image quality is effectively improved.

However, when considering brightness changes with little differences in luminance as shown in FIG. 12, for example, there are edge areas of a length as short as about three pixels. Therefore, the Sobel operators detect these areas as the edge areas as shown in FIG. 13.

However, parts having many short edge areas in different directions are referred to as texture areas, and are not the boundaries of the photogenic subject or the characters. Therefore, these parts need not to be sharpened. These parts are parts which are not desired to be detected as the edge areas in terms of throughput saving. However, there is a problem that these parts are detected as the edge areas.

SUMMARY OF THE INVENTION

In view of such problem, it is an object of the invention to provide an image processing apparatus which is able to detect only edge areas but not texture areas and a method thereof.

According to embodiments of the present invention, there is provided an image processing apparatus including: an input unit configured to input an image; a pixel value setting unit configured to set respective pixel values in a template block including a pixel in the image sequentially; an arranging unit configured to arrange a plurality of reference blocks of the same shape and size as the template block in the image so as to surround the template block; an error calculating unit configured to obtain block matching errors between the respective pixel values of the plurality of reference blocks which surround the temperate block and the respective pixel values in the template block; and a determining unit configured to determine the pixel to be determined to be in an edge area when a minimum value in the block matching errors is a deviated value from all the block matching errors, and not to be in the edge area when the minimum value is not the deviated value.

According to the embodiments of the invention, only the edge areas which are not texture areas are detected, so that useless processing is omitted.

BRIEF DESCRIPTION OF THE DRAWINGS

FIG. 6 shows an edge detection operator in the related art.

FIG. 7 shows an edge detection operator in the related art.

FIG. 10 shows an example of image data having a long edge area.

FIG. 11 shows a result after having applied a Sobel filter to the long edge area.

FIG. 12 shows an example of image data having short edge areas.

DETAILED DESCRIPTION OF THE INVENTION

Figure 1:
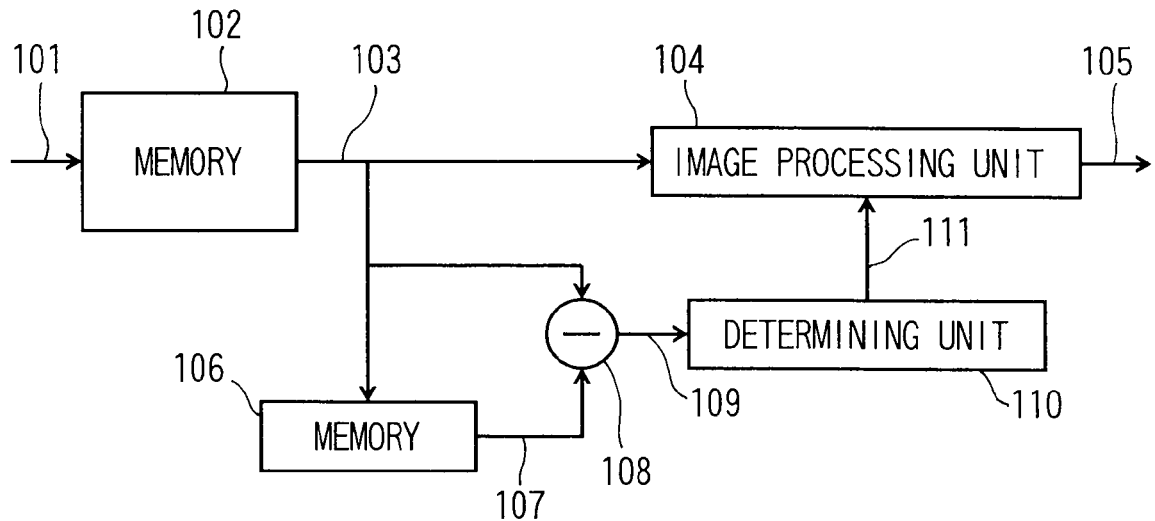
FIG. 1 is a block diagram showing an image processing apparatus according to a first embodiment of the invention.

Referring now to the drawings, an image processing apparatus 100 according to a first embodiment of the invention will be described.

First Embodiment

Referring now to FIG. 1 to FIG. 8, FIG. 10 to FIG. 18, FIG. 20, and FIG. 21, the image processing apparatus 100 according to the first embodiment of the invention will be described.

(1) Configuration of Image Processing Apparatus 100

FIG. 1 is a block diagram of the image processing apparatus 100 according to the first embodiment.

The image processing apparatus 100 includes memories 102 and 106, an image processing unit 104, a differencing unit 108, and an edge determining unit 110.

Respective functions of the image processing unit 104, the differencing unit 108, and the edge determining unit 110 may be realized by programs stored in a computer.

(2) Memory 102 and Memory 106

In the memory 102, image data 101 to be processed is entered from the outside via an image input unit and stored therein.

The image processing apparatus 100 processes the image stored in the memory 102 to set respective pixels as pixels sequentially, for example, rightward from an upper left of a screen in the order from up to down, and determine the respective pixels whether it is an edge area or not.

Therefore, a pixel value arranging function of the image processing apparatus 100 reads N×N pixels including the pixel to be determined at the center as a template block 103 from the memory 102 and stores the same in the memory 106.

Figure 3:
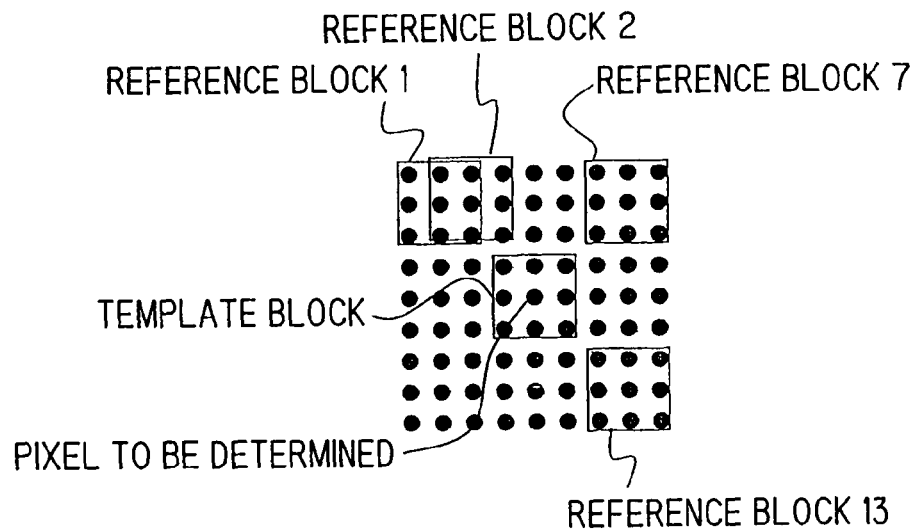
FIG. 3 illustrates an arrangement of blocks in edge detection.

FIG. 3 shows a positional relationship among the pixel to be determined, the template block, and reference blocks. In FIG. 3, black circles represent pixels, and an example of the case N=3 is shown.

An arranging function of the image processing apparatus 100 sets thirteen reference blocks in the image so as to surround the periphery of the template block including the pixel to be determined. A reference block 1 is arranged on the upper left of the template block, and a reference block 2 is a block moved from the reference block 1 by one pixel rightward. Reference blocks 3, 4, 5, and 6 follow, not shown, and a block on the upper right of the template block corresponds to a reference block 7. The image processing apparatus 100 sets reference blocks from 8 to 13 in the image by moving downward therefrom by one pixel. The reference block 1 in this example is displaced from the template block by three pixels leftward and three pixels upward. However, this displacement may be larger than three pixels (see FIG. 20), and may be smaller than that (see FIG. 21). In other words, there may be a gap between the template block and the reference block and, in contrast, the both blocks may be overlapped.

Since the edge area is generally extended in both directions, the reference blocks are set to surround the template block along a half round as shown in FIG. 3.

As shown in FIG. 1, the image processing apparatus 100 reads a luminance value, that is, a pixel value 103 of the reference block 1 from the memory 102, and sends it to the differencing unit 108. Simultaneously, the image processing apparatus 100 also reads a pixel value 107 of the template block from the memory 106, and sends the same to the differencing unit 108.

(3) Differencing Unit 108

The differencing unit 108 performs a function of an error calculating unit. The differencing unit 108 calculates a block matching error (hereinafter, referred to simply as "error") 109 between the reference block 1 and the template block.

A sum of absolute values or a sum of squares of a difference of the pixel value of the pixels at the same positions is used as the error 109. The differencing unit 108 then sends the error 109 to the determining unit 110.

In this manner, the differencing unit 108 switches from the reference blocks from 1 to 13 in sequence and sends the respective errors 109 to the determining unit 110.

(4) Distribution of Errors

Figure 17:
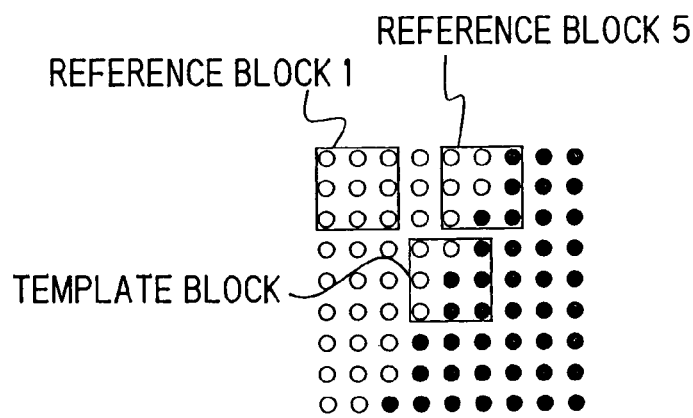
FIG. 17 shows a process of application of the edge detection according to this embodiment to the long edge area.

FIG. 17 shows a state of a template block arranged in the edge area and reference blocks thereof. Circles represent pixels, and the black and white colors thereof represent the luminance value of the pixels. In this example, the luminance is expressed in two tones for the simplicity. However, general pictures have multiple tones, and the luminance thereof has 256 tones, for example, from 0 to 255.

Figure 4:
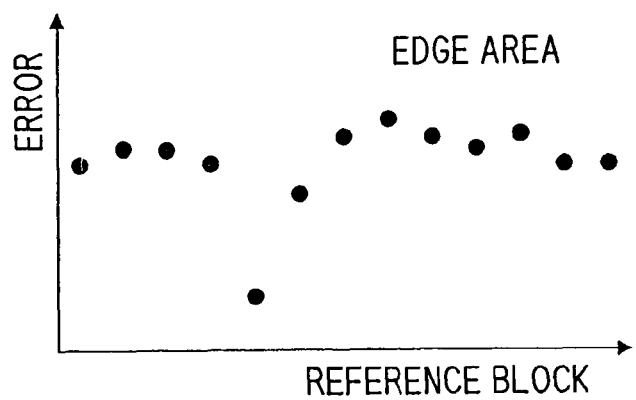
FIG. 4 shows a state of errors in the edge detection.

When the template block and the reference block 1 are compared, five pixels out of nine pixels are significantly different in luminance. Therefore, the error in this case is a large value. The errors are large inmost of reference blocks not shown as in the case of the reference block 1. Among others, the error in the reference block 5 is specifically small because only one pixel at the center from among nine pixels is different. In such an edge area, a graph of errors calculated for each reference block is shown in FIG. 4. As shown in FIG. 4, when the template block includes an edge, the error with respect to the reference block nearby having a similar luminance pattern is specifically small, and errors with respect to other reference blocks are large.

Figure 18:
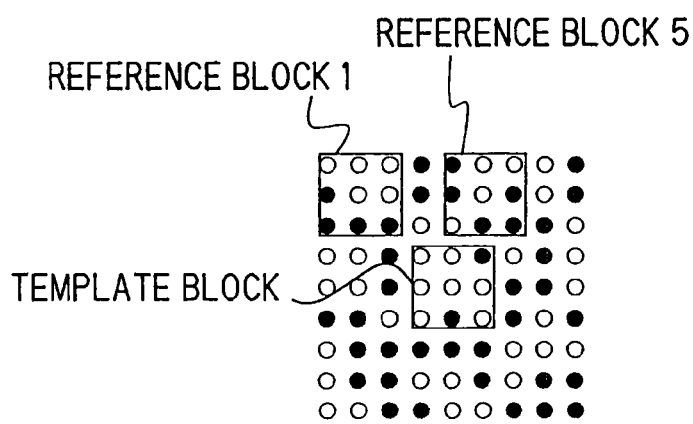
FIG. 18 shows a process of application of the edge detection according to this embodiment to the short edge area.

FIG. 18 shows a state of a template block arranged in the texture area and reference blocks thereof.

Figure 5:
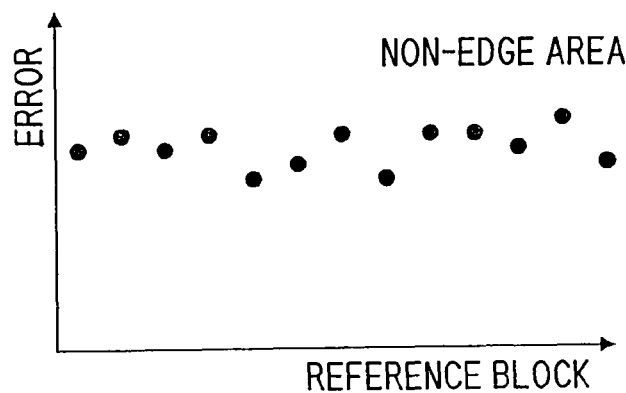
FIG. 5 shows a state of errors in the edge detection.

In this case, the luminance patterns of the template block and the respective reference blocks are all different, and there is no reference block having a specifically small error as shown in a graph in FIG. 5.

(5) Determining Unit 110

Utilizing difference in errors as described above, the determining unit 110 in FIG. 1 determines that the pixel to be determined in a certain reference block having an error specifically smaller than other errors is in the edge area, and the pixel to be determined not in such a reference block is not in the edge area.

More specifically, there is a method of determination as shown below.

In a first method, when the minimum value of error is a deviated value from among all the errors, in this case, from among thirteen errors, the pixel to be determined is determined to be in the edge area.

In a second method, assuming that the minimum value of error is M and the average of error is A, when the value of M/A is smaller than the threshold value, the pixel to be determined is determined to be in the edge area.

In a third method, when the difference between the smallest error value and the second smallest error vale is larger than the threshold value, the pixel to be determined is determined to be in the edge area.

In a fourth method, when the minimum value of error is smaller than the value of "average of errors−coefficient× standard deviation", the pixel to be determined is determined to be in the edge area.

Figure 14:
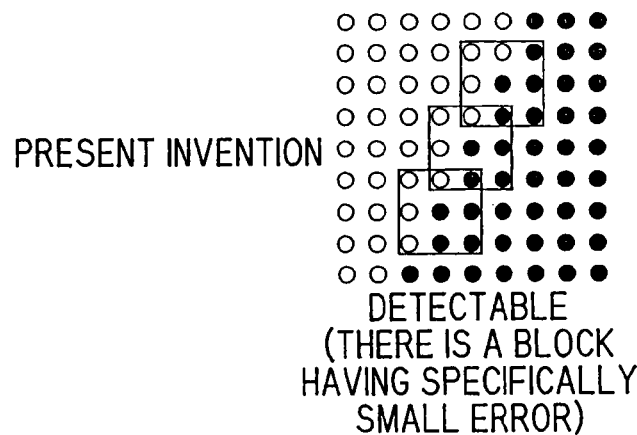
FIG. 14 shows a result after having applied the edge detection according to this embodiment to the long edge area.
Figure 15:
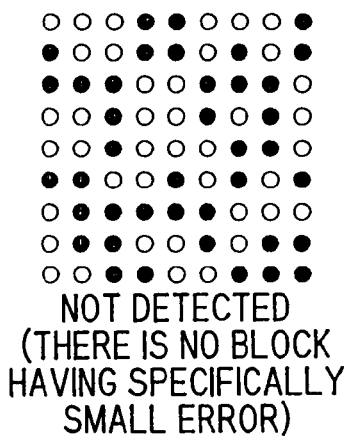
FIG. 15 shows a result after having applied the edge detection according to this embodiment to the short edge areas.
Figure 16:
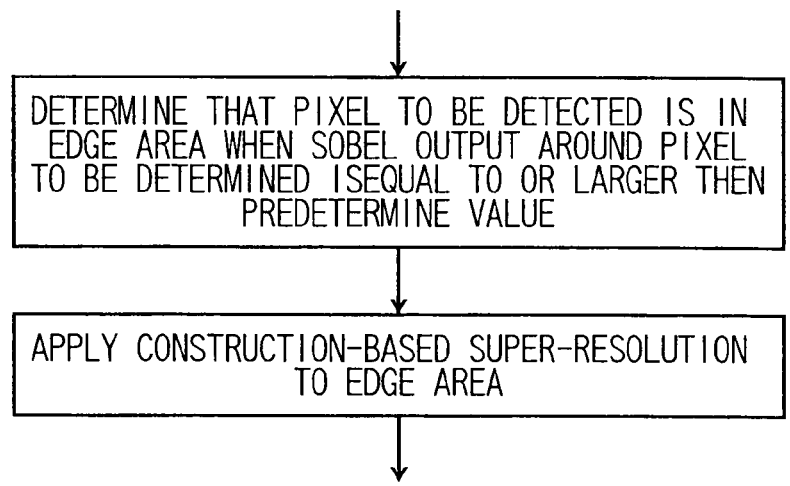
FIG. 16 is a flowchart in the related art.

FIG. 14 and FIG. 15 show examples of template blocks which are determined to be in the edge areas in the first embodiment in the edge area and the texture area, respectively.

As shown in FIG. 14, if there is a long edge area, the edge can be correctly detected along the long edge area as in the case of the Sobel operator.

On the other hand, as shown in FIG. 15, in the texture area, misdetection as the edge does not occur as in the case of the Sobel operator. Since the edge area is not detected, the template block is not shown in the drawing.

(6) Image Processing Unit 104

As shown in FIG. 1, the image processing apparatus 100 sends a determined result 111 to the image processing unit 104. Simultaneously, the image processing apparatus 100 also sends an image data 103 from the memory 102 to the image processing unit 104.

The image processing unit 104 performs image processing such as sharpening (see Suematsu, et. al) in the periphery of the area which is determined as the edge area by the determined result 111.

The image processing unit 104 repeats the processing while setting the respective pixels in the screen as the pixel to be determined and image data 105 having improved image quality is sent outward.

The order of the edge determination and the image processing may be such that the image processing is performed on the periphery of each pixel every time when the pixel is determined, or the image processing is performed altogether after having determined all the pixels in the screen.

(7) Operation of Image Processing Apparatus 100

Figure 2:
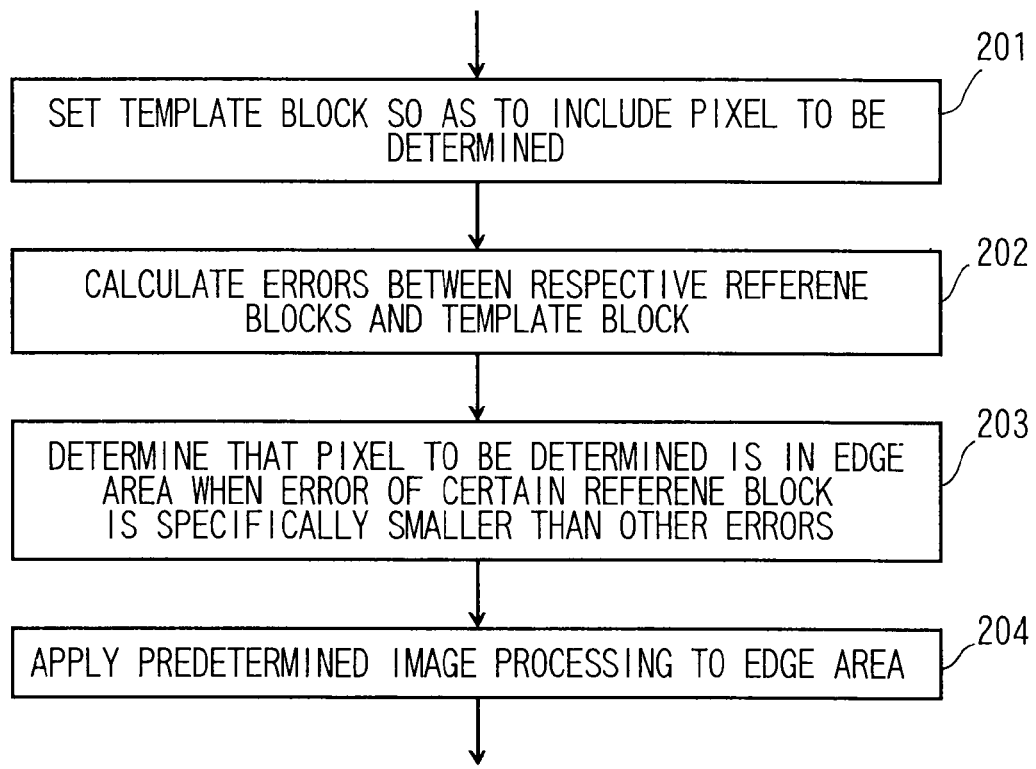
FIG. 2 is a flowchart of the same image processing apparatus.

FIG. 2 shows a flowchart according to the first embodiment.

In Step 201, the image processing apparatus 100 sets a template block so as to include the pixel to be determined.

In Step 202, the differencing unit 108 calculates the errors between the respective reference blocks and the template block.

In Step 203, the determining unit 110 determines that the pixels to be determined in a certain reference block having an error specifically smaller than other errors is in the edge area, and the pixel to be determined not in such a reference block is not in the edge area.

In Step 204, the image processing unit 104 performs a predetermined image processing on the edge area.

Second Embodiment

Figure 9:
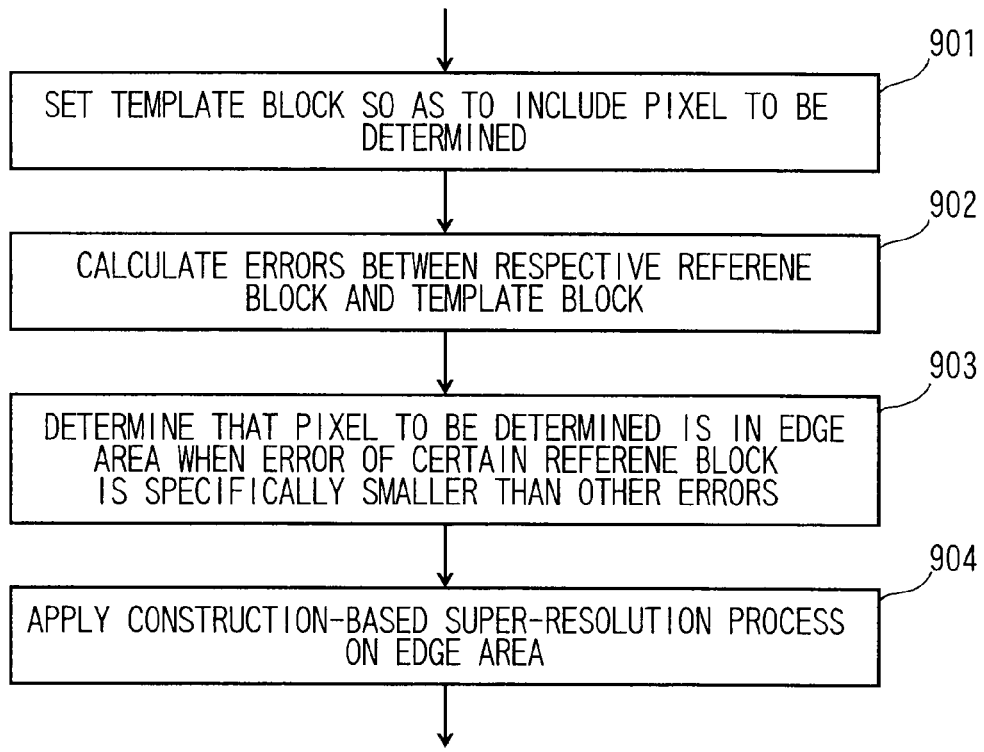
FIG. 9 is a flowchart according to a second embodiment.
Figure 13:
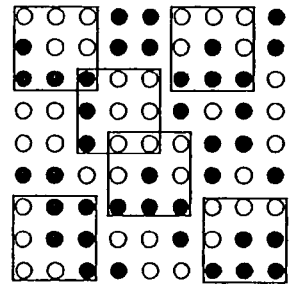
FIG. 13 shows a result after having applied a Sobel filter to the short edge areas.
Figure 19:
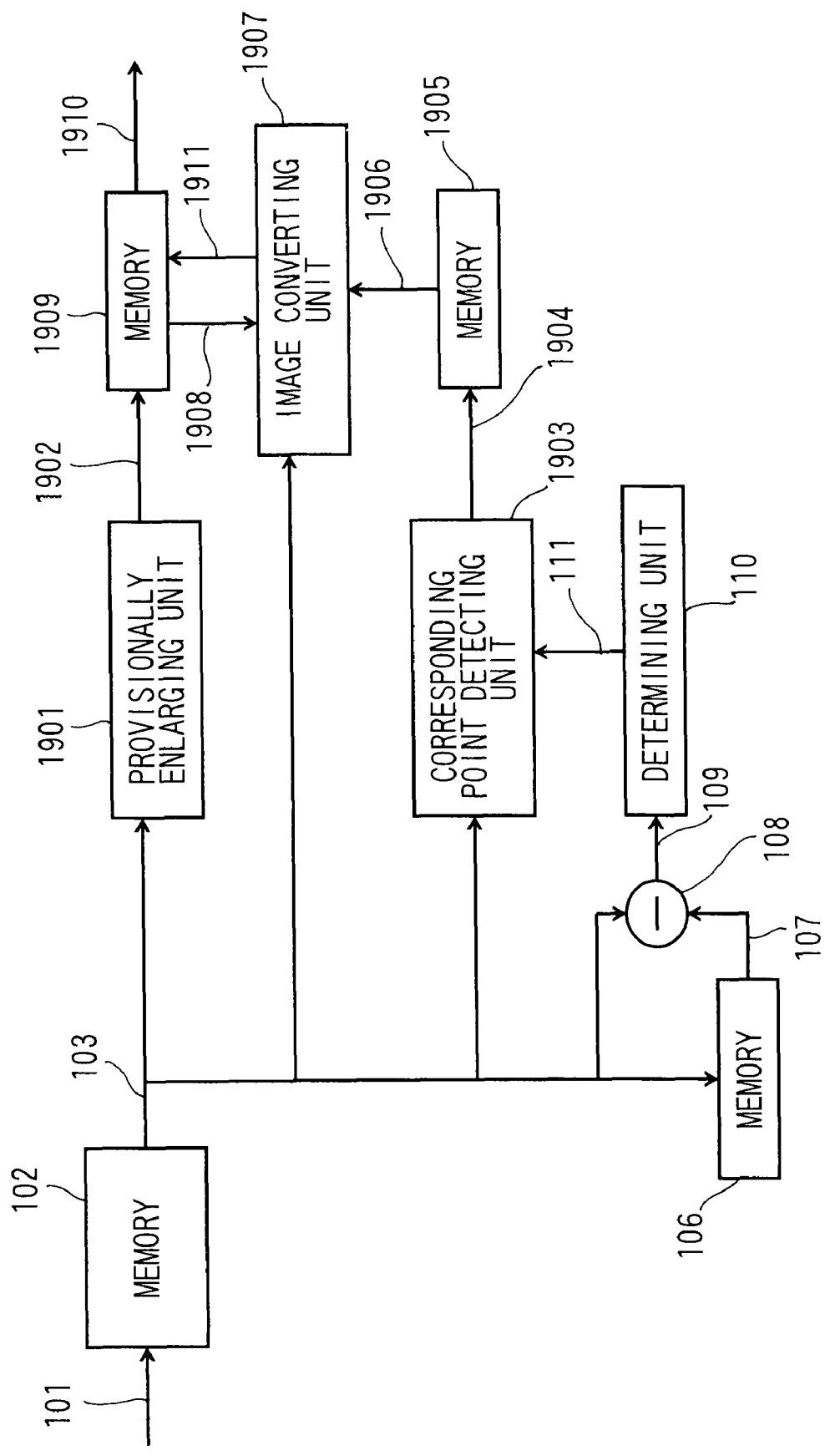
FIG. 19 is a block diagram of the image processing apparatus according to a second embodiment.
Figure 20:
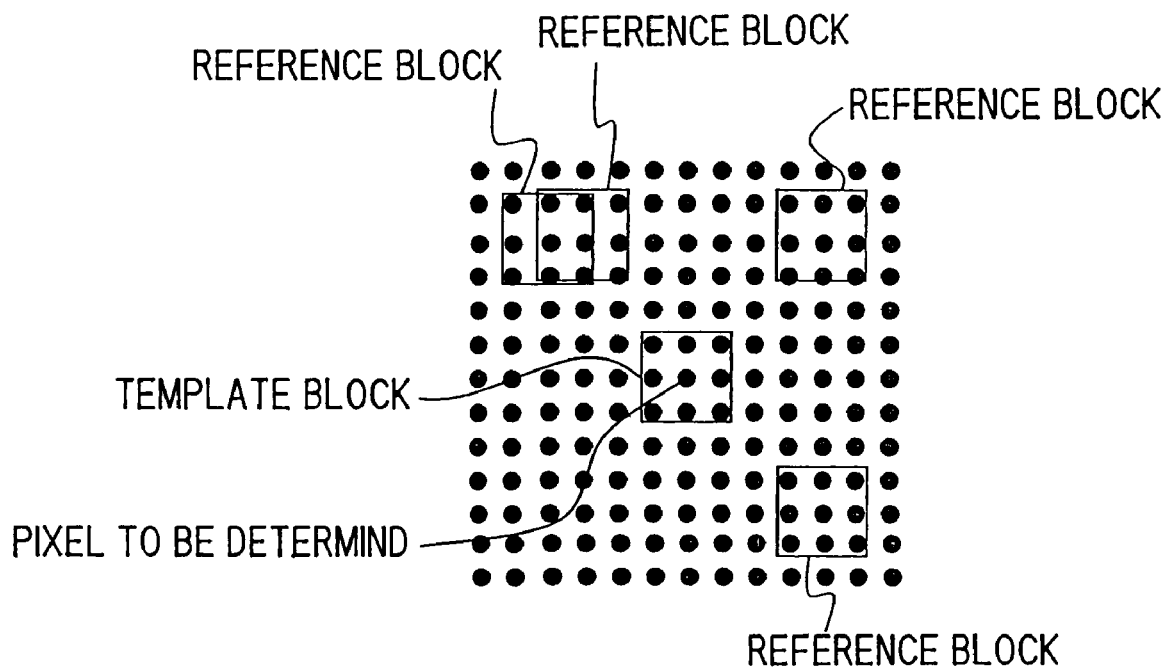
FIG. 20 shows an arrangement of blocks in the edge detection.
Figure 21:
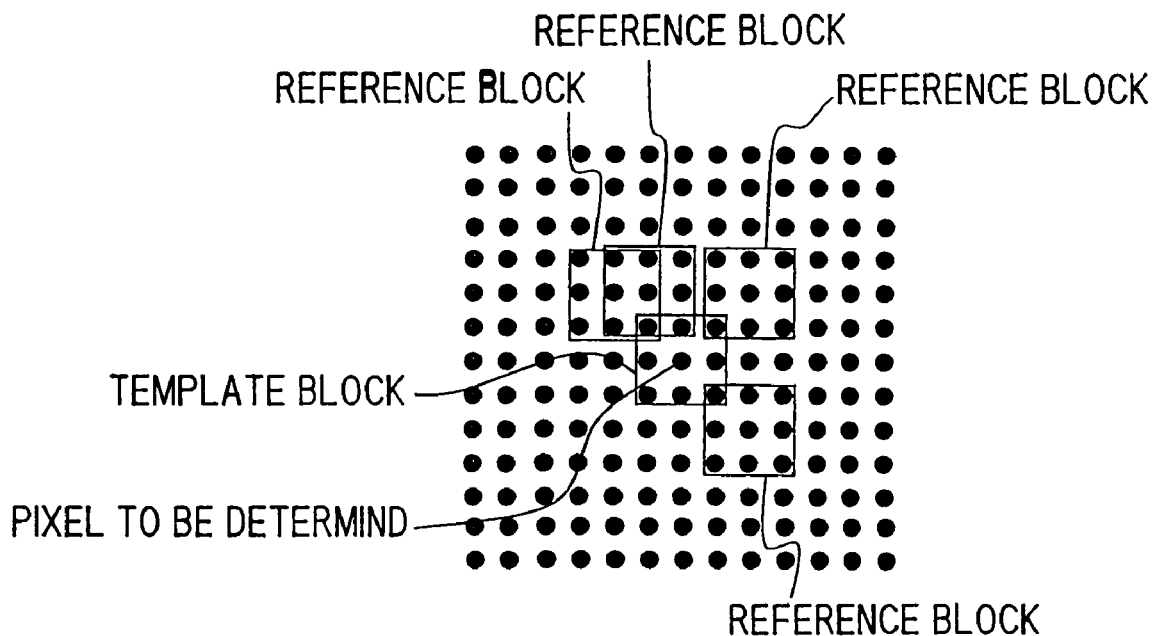
FIG. 21 shows an arrangement of blocks in the edge detection.

Referring now to FIG. 9 and FIG. 19, the image processing apparatus 100 according to a second embodiment will be described.

The invention is also effective for In-frame Construction-based Super-Resolution (see Suematsu, et. al) which sharpens images while increasing resolution, that is, increasing the number of pixels or enlarging the scale in the image processing instead of a simple sharpening.

In the In-frame Construction-based Super-Resolution, the respective pixels in the entered image are set as a target pixel in sequence, and a plurality of points corresponding to the respective target pixels are searched along the edge area, and pixels values of the target pixels are copied as sampled values of the corresponding points. After having increased the density of the sampled points in this manner, the image quality is sharpened by a reconstruction process such as POCS (Projection Onto Convex Sets) method or MAP (maximum a posteriori) method.

The image processing unit 104 in FIG. 1 performs this In-frame Construction-based Super-Resolution. This method is specifically effective for the edge area in the image, target pixels are set only in the portion determined as the edge area from the determined result 111 for the search of the corresponding points. The search of the corresponding points is not performed for areas other than the edge area.

FIG. 19 is a block diagram of the image processing apparatus 100 in the second embodiment. The procedure until the determined result 111 is obtained while reading the image data 103 from the memories 102 and 106 is the same as in FIG. 1, and the description thereof will be omitted.

The image processing apparatus 100 enters the image data 103 to a provisionally enlarging unit 1901 while performing the edge determination.

The provisionally enlarging unit 1901 increases the number of pixels in the image data 103 by, for example, Cubic Convolution Interpolation or Bilinear Interpolation, and sends the same to a memory 1909 as a provisionally enlarged image data (provisional high-resolution image data) 1902 and stores the same therein.

The image processing apparatus 100 enters the image data 103 to a corresponding point detecting unit 1903.

The corresponding point detecting unit 1903 sets pixels in the image data 103 as target pixels one by one, searches the corresponding points from the same image at the decimal point accuracy, sends positional information 1904 of the corresponding points to a memory 1905, and stores the same.

After having stored the positional information of a number of corresponding points, the corresponding point detecting unit 1903 sends a positional information 1906 of the corresponding points from a memory 1905 to an image converting unit 1907.

The image converting unit 1907 calculates the errors of the sampled values of a high-resolution image data 1908 on the basis of the pixel values of the target pixels in the image data 103 and the positions of the corresponding points in the positional information 1906 of the corresponding points. The image converting unit 1907 overwrites a high-resolution image data 1911 whose value is corrected to be smaller in error in the memory 1909.

After having performed the renewal of the high-resolution image by a several times, the image converting unit 1907 outputs the same to the outside as a sharpened image data 1910.

FIG. 9 is a flowchart in the case of performing the In-frame Construction-based Super-Resolution as the image processing. The procedure from Step 901 to Step 903 is the same as in FIG. 2, and hence the description thereof is omitted.

In Step 904, the image processing unit 104 performs the process of the In-frame Construction-based Super-Resolution on the edge areas.

In Suematsu, et. al, the Sobel operator is used for the edge detection. However, in the second embodiment, since the edge areas other than the texture areas can be detected, the useless processing is not performed, and hence the sharpening of the entire image is achieved in a short time.

The In-frame Construction-based Super-Resolution utilizes such property that the similar pattern in luminance is present nearby as in the second embodiment. Therefore, improvement of the image quality is ensured by confirming the fact that the similar pattern is present nearby in advance.

In the second embodiment, it is estimated that the edge area is present in the direction from the position of the template block to the reference block having the smallest error. Therefore, in the second embodiment, the determined result 111 including the direction of the corresponding edge area is sent from the determining unit 110 to the corresponding point detecting unit 1903. Then, in the second embodiment, the throughput for the search of the corresponding points is saved by performing the search of the corresponding points only in the direction of the corresponding edge area.

(Modification)

The invention is not limited to the embodiments shown above, and may be modified in various manners without departing from the scope of the invention.

Figure 8:
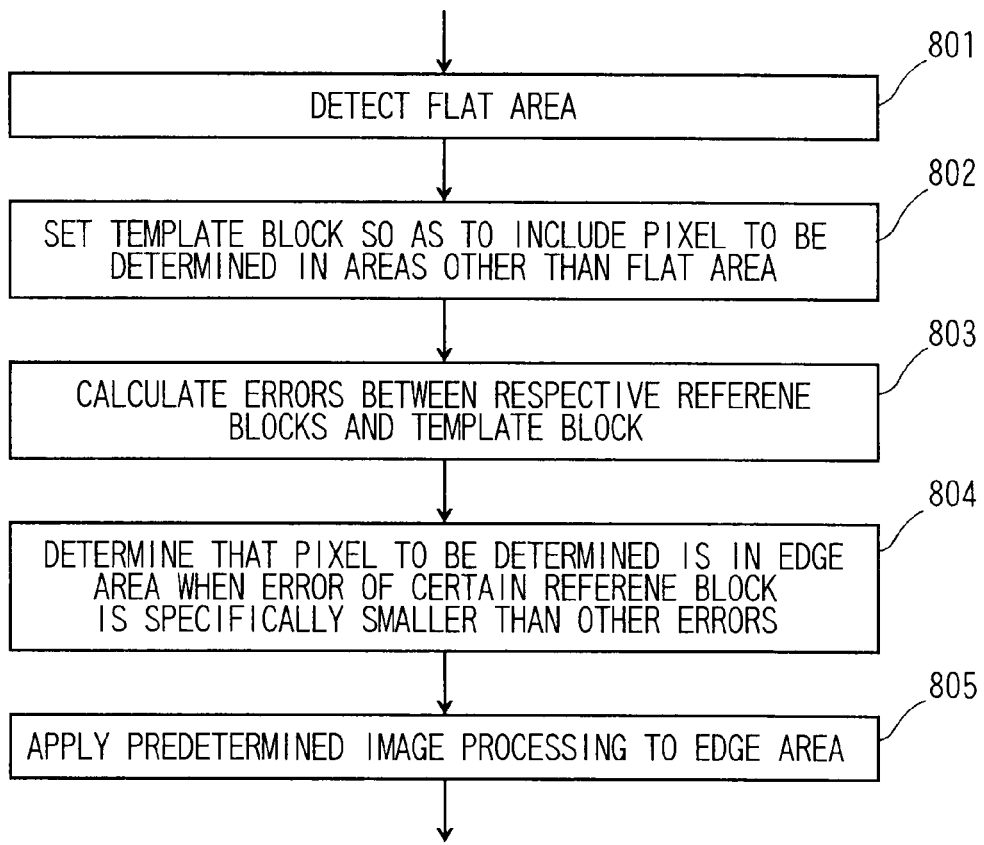
FIG. 8 is a flowchart according to the first embodiment.

As a first modification, in the above described embodiments, flat area detection may be performed for the entire screen before the edge determination as shown in FIG. 8.

For example, the image processing apparatus 100 in the first modification divides the screen into larger blocks. The image processing apparatus 100 in the first modification calculates dispersion of the luminance values in each block. The image processing apparatus 100 in the first modification determines that it is a flat area when the dispersion is smaller than a threshold value (see Step 501). Since the flat area needs not to be sharpened, the image processing apparatus 100 does not set the pixels in the portion determined as the flat area as the pixels to be determined, and perform the image processing in other areas in the same manner as the above-described embodiments (see Step 802 to 805). Accordingly, the image processing apparatus 100 in the first modification is able to save the entire throughput by not performing the edge determination or the image processing.

In a second modification, the reference blocks may be arranged so as to surround the template block along a full circle. In the case of the half round, one specifically small error appears in the edge area as described above, while in the case of the full circle, two of those appear in general.

Therefore, when the full circle is selected, a method of determining the edge area when the average value of the smallest error and the second smallest error is smaller than the average value of the remaining errors by more than the predetermined value is also effective as the edge determining method.

What is claimed is:

1. An image processing apparatus comprising:
an input unit configured to input an image;
a pixel value setting unit configured to set respective pixel values in a template block including a pixel in the image sequentially;
an arranging unit configured to arrange a plurality of reference blocks of the same shape and size as the template block in the image so as to surround the template block;
an error calculating unit configured to obtain block matching errors between the respective pixel values of the plurality of reference blocks which surround the temperate block and the respective pixel values in the template block; and
a determining unit configured to determine the pixel to be determined to be in an edge area when a minimum value in the block matching errors is a deviated value from all the block matching errors, and not to be in the edge area when the minimum value is not the deviated value.

2. The apparatus according to claim 1, wherein the determining unit determines that the pixel to be determined is in the edge area when the value of M/A is smaller than a threshold value and that the pixel to be determined is not in the edge area when the value of M/A is larger than the threshold value, where M is a minimum value in the block matching errors and A is an average of the block matching errors.

3. The apparatus according to claim 1, wherein the determining unit determines that the pixel to be determined is in the edge area when the difference between the smallest error and the second smallest error in the block matching errors is larger than a threshold value and determines that the pixel to be determined is not in the edge area when the difference is smaller than the threshold value.

4. The apparatus according to claim 1, wherein the determining unit determines that the pixel to be determined is in the edge area when a minimum value in the block matching errors is smaller than the value of C (where, C=average of errors−coefficient×standard deviation of error), and that the pixel to be determined is not in the edge area when the minimum value is larger than the value of C.

5. The apparatus according to claim 1, wherein the arranging unit arranges the plurality of reference blocks so as to surround the template block only the half round.

6. The apparatus according to claim 1, wherein the arranging unit arranges the plurality of reference blocks so as to be displaced by one pixel each with respect to the template block.

7. The apparatus according to claim 1, further comprising a flat area detecting unit configured to detect an area having no change in luminance value in the image as a flat area,
wherein the pixel value setting unit does not set the pixel to be determined in the detected flat area, and sets the pixel to be determined in the area other than the flat area.

8. The apparatus according to claim 1, further comprising an image processing unit configured to sharpen the image in which the edge area is determined by the determining unit.

9. The apparatus according to claim 1, further comprising an image processing unit configured to increase the resolution of the image whose edge area is determined by the determining unit,
wherein the image processing unit includes:
a target pixel setting unit configured to set the respective pixels of the image one by one as the target pixel in sequence;
a provisionally enlarging unit configured to calculate the pixel value of a provisional high-resolution image having a larger number of pixels than the number of pixels of the image as a provisional high-resolution pixel value;
a corresponding point detecting unit configured to search at least one corresponding point of the target pixel in the provisional high-resolution image at the decimal point accuracy; and
an image converting unit configured to calculate the pixel value at a high resolution according to the error between the pixel value of the target pixel and the sampled value of the provisional high-resolution image at the corresponding point.

10. The apparatus according to claim 9, wherein the corresponding point detecting unit searches the corresponding point in the direction from the template block to the reference block from which the smallest value from among the block matching errors is obtained.

11. The apparatus according to claim 1, wherein the error calculating unit obtains the block matching error from a sum of absolute values or a sum of squares of a difference between the respective pixel values of the plurality of reference blocks and the respective pixel values of the template block.

12. An image processing method comprising:
a step of inputting an image;

a step of setting a pixel value for setting respective pixel values in a template block including a pixel in the image sequentially;

a step of arranging a plurality of reference blocks of the same shape and size as the template block in the image so as to surround the template block;

a step of calculating an error for obtaining block matching errors between the respective pixel values of the plurality of reference blocks which surround the temperate block and the respective pixel values in the template block; and a step of determining the pixel to be determined to be in an edge area when a minimum value in the block matching errors is a deviated value from all the block matching errors, and not to be in the edge area when the minimum value is not the deviated value.

13. A non-transitory computer readable medium storing an image processing program which when executed by a computer results in performance of functions comprising:

a function of inputting an image;

a function of setting a pixel value for setting respective pixel values in a template block including a pixel in the image sequentially;

a function of arranging a plurality of reference blocks of the same shape and size as the template block in the image so as to surround the template block;

a function of calculating an error for obtaining block matching errors between the respective pixel values of the plurality of reference blocks which surround the temperate block and the respective pixel values in the template block; and a function of determining the pixel to be determined to be in an edge area when a minimum value in the block matching errors is a deviated value from all the block matching errors, and not to be in the edge area when the minimum value is not the deviated value.

* * * * *